(12) United States Patent
William

(10) Patent No.: US 6,185,011 B1
(45) Date of Patent: Feb. 6, 2001

(54) FLATBED SCANNER WITH TOP AND BOTTOM LIGHT SOURCES AND A MOVEABLE LIGHT SHIELD

(75) Inventor: Leu William, Taipei (TW)

(73) Assignee: Acer Peripherals, Inc., Taoyuan (TW)

( * ) Notice: Under 35 U.S.C. 154(b), the term of this patent shall be extended for 0 days.

(21) Appl. No.: 09/034,168

(22) Filed: Mar. 2, 1998

(30) Foreign Application Priority Data

Jan. 22, 1998 (TW) .................................... 87100860

(51) Int. Cl.$^7$ ........................................... H04N 1/40
(52) U.S. Cl. ............................................... 358/474
(58) Field of Search .................... 358/474, 487, 358/506, 494, 497, 498

(56) References Cited

U.S. PATENT DOCUMENTS

| | | |
|---|---|---|
| 4,540,269 | 9/1985 | Thorne . |
| 4,879,604 * | 11/1989 | Koshiyouji ............................ 358/494 |
| 4,893,196 * | 1/1990 | Koshiyouji ............................ 358/474 |
| 4,989,099 * | 1/1991 | Koshiyouji et al. ................. 358/487 |
| 5,038,227 | 8/1991 | Koshiyouji et al ................... 358/471 |
| 5,392,100 * | 2/1995 | Yoshida ................................ 358/494 |
| 5,606,450 * | 2/1997 | Chen .................................... 358/487 |
| 5,703,674 * | 12/1997 | Nishio ..................................... 355/46 |
| 5,780,829 * | 7/1998 | Tsai et al. ............................ 358/474 |
| 5,814,809 | 9/1998 | Hein . |
| 5,898,508 * | 4/1999 | Bekanich ............................... 358/474 |

FOREIGN PATENT DOCUMENTS

| | | |
|---|---|---|
| 310912 | 7/1997 | (TW) . |
| 313936 | 8/1997 | (TW) . |

* cited by examiner

*Primary Examiner*—Jerome Grant, II

(57) ABSTRACT

The present invention relates to a flatbed scanner with both a top light source and a bottom light source which can be easily switched by using a top light shield to scan transparent documents and opaque documents. The scanner comprises a housing, a scanning module, a top cover, a top light source, and light shield. The housing comprises a transparent platform for placing a document. The scanning module is slidably installed inside the housing for scanning the document placed on the transparent platform. The scanning module comprises a bottom light source for emitting light upward toward the document and an image converter for converting an image of the document into a digital image. The top cover is movably installed on the housing. The top light source is installed under the top cover for emitting light downward toward the document when the top cover is placed on the transparent platform. The light shield is movably installed under the top cover for shielding the top light source. When the top light source is covered by the light shield, the document image received by the image converter is generated by the light emitted from the bottom light source. When the top light source is not covered by the light shield, the bottom light source will be switched off and the document image received by the image converter is generated by the light emitted from the top light source.

14 Claims, 3 Drawing Sheets

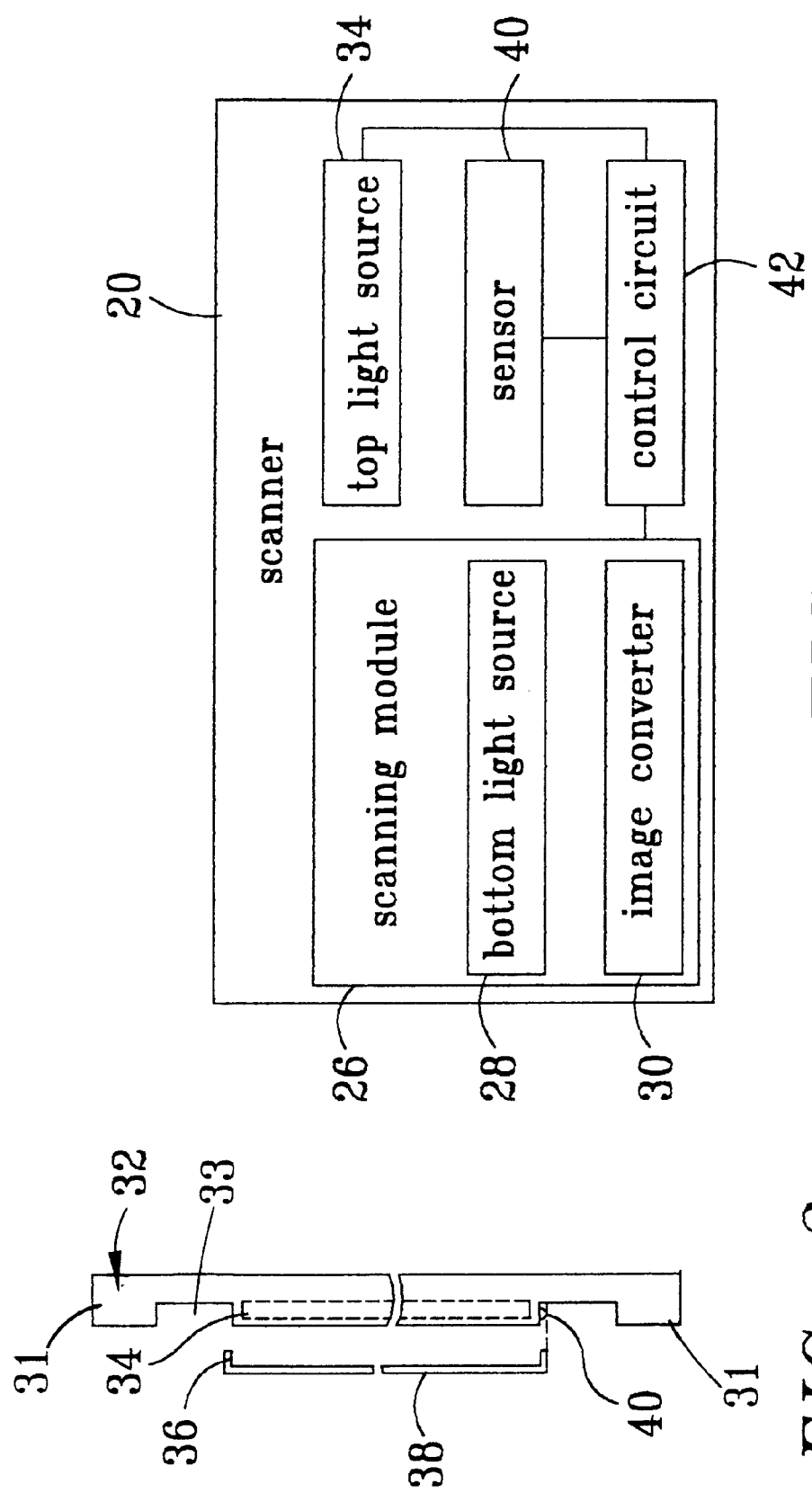

FLATBED SCANNER WITH TOP AND BOTTOM LIGHT SOURCES AND A MOVEABLE LIGHT SHIELD

BACKGROUND OF THE INVENTION

1. Field of the Invention

The invention relates to an image scanner, and more particularly, to a flatbed scanner with top and bottom light sources and a moveable light shield for scanning transparent and opaque documents.

2. Description of the Prior Art

Please refer to FIG. 1. FIG. 1 is a perspective view of a prior art scanner 10. The scanner 10 comprises a housing 12 with a transparent platform 14 on its top end for placing a document to be scanned, and a scanning module (not shown) movably installed under the transparent platform 14 for scanning the document placed on the transparent platform 14. The scanning module usually comprises a light source for emitting light upward and an image converter such as a CCD (charge coupled device) for converting a document image reflected from the document into a digital image. Since the light source is installed under the transparent platform 14, the scanner 10 can only be used to scan opaque documents. If a user needs to scan a transparent document such as a photographic negative film, the user has to place a portable light panel 16 above the transparent platform 14 for emitting light downward through the transparent document and turn off the light source under the transparent platform 14. The portable light panel 16 requires an external power adapter which should be plugged into a power socket before using. Using such a portable light panel 16 is very inconvenient.

Except for the portable light panel 16, many scanner manufacturers provide a removable top cover equipped with a light panel for scanning transparent documents. When scanning a transparent document, a user has to remove the original top cover from a scanner, and install the top cover with the light panel. Because the top cover with the light panel is quite heavy and comprises an electric plug, the replacement of the top cover is also very inconvenient. Besides, if a user frequently needs to scan both transparent and opaque documents, the two top covers of the scanner have to be swapped quite frequently and this is very bothering.

SUMMARY OF THE INVENTION

It is therefore a primary objective of the present invention to provide a scanner which avoids replacing the top cover of the scanner to solve the above mentioned problem.

Briefly, in a preferred embodiment, the present invention provides a scanner comprising:

- a housing having a transparent platform for placing a document;
- a scanning module slidably installed inside the housing for scanning the document placed on the transparent platform, the scanning module comprising a bottom light source for emitting light upward toward the document and an image converter for converting an image of the document into a digital image;
- a top cover movably installed on the housing;
- a top light source installed under the top cover for emitting light to the document when the top cover is placed on the transparent platform;
- a light shield movably installed under the top cover for shielding the top light source;
- a sensor installed under the top cover for detecting whether the top light source is covered by the light shield; and a control circuit for switching on and off the top light source and the bottom light source in response to the sensor;

wherein when the top light source is covered by the light shield, the document image received by the image converter is generated by the light emitted from the bottom light source, and when the top light source is not covered by the light shield, the bottom light source will be turned off and the document image received by the image converter is generated by the light emitted from the top light source.

It is an advantage of the present invention that the scanner comprises top and bottom light sources and a moveable light shield so that when scanning a transparent document, a user only has to remove the light shield instead of the top cover. And when scanning an opaque document, only the light shield needs to be mounted on top of the top light source.

These and other objects and the advantages of the present invention will no doubt become obvious to those of ordinary skill in the art after having read the following detailed description of the preferred embodiment that is illustrated in the various figures and drawings.

BRIEF DESCRIPTION OF THE DRAWINGS

FIG. 3 is a sectional view along line 3—3 of the scanner shown in FIG. 2.

FIG. 4 is a function block diagram of the scanner shown in FIG. 2.

DETAILED DESCRIPTION OF THE PREFERRED EMBODIMENT

Figure 2:
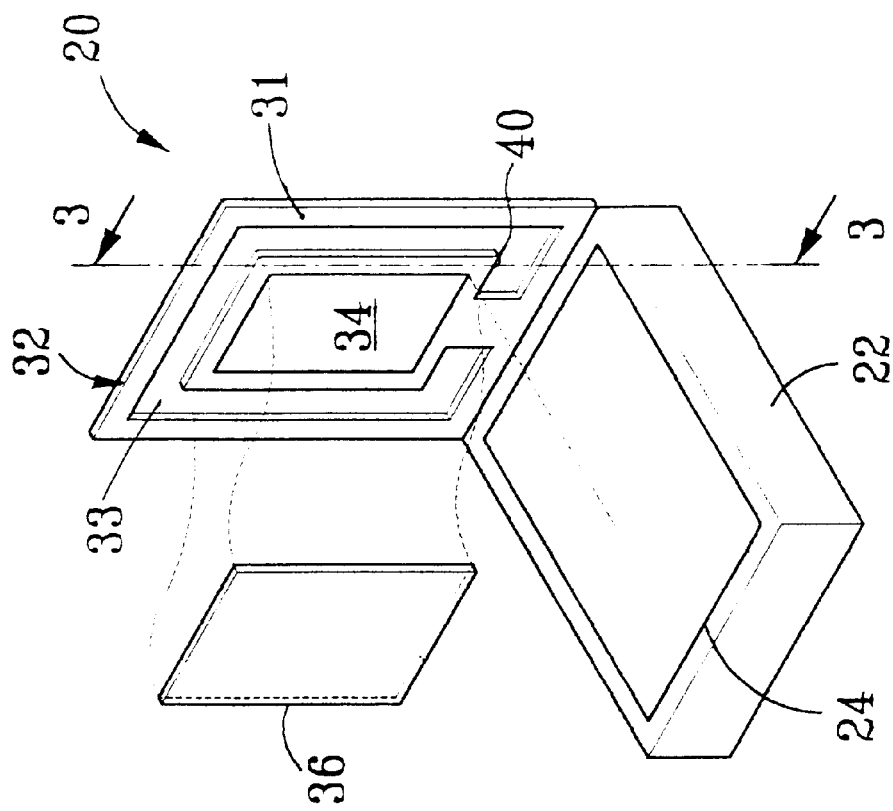
FIG. 2 is a perspective view of a scanner according to the present invention.
Figure 1:
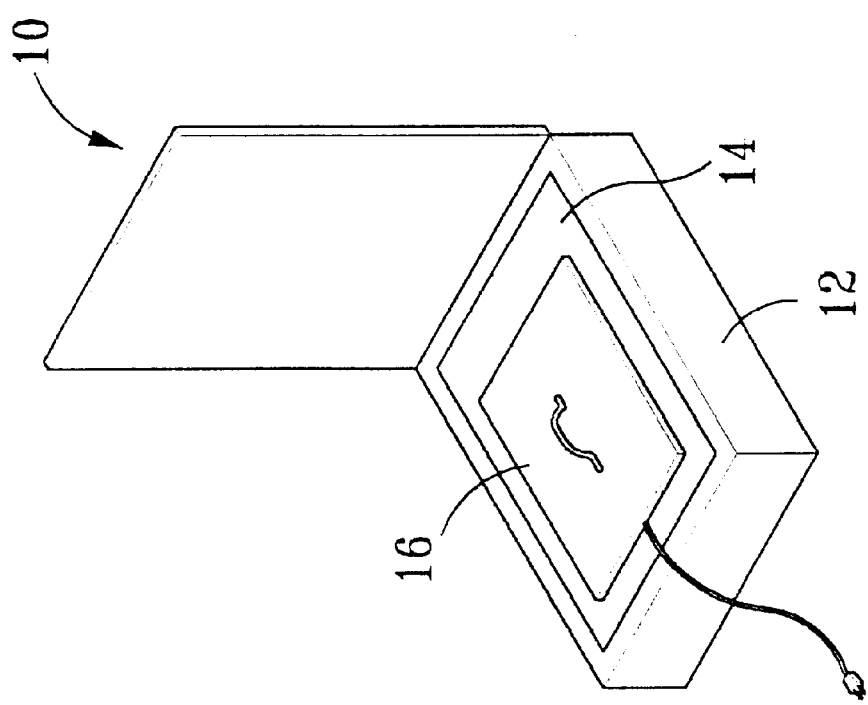
FIG. 1 is a perspective view of a prior art scanner.

Please refer to FIGS. 2 to 4. FIG. 2 is a perspective view of a scanner 20 according to the present invention. FIG. 3 is a sectional view along line 3—3 of the scanner 20. FIG. 4 is a function block diagram of the scanner 20. The scanner 20 comprises a housing 22 having a transparent platform 24 installed on its top end for placing a document to be scanned, a scanning module 26 slidably installed inside the housing 22 for scanning the document placed on the transparent platform 24, a top cover 32 pivotally installed on the top end of the housing 22, a top light source 34 installed under the top cover 32 for emitting light toward the document when the top cover 32 is placed on the transparent platform 24, and a light shield 36 removably mounted below the top cover 32 for covering the top light source 34. The scanning module 26 comprises a bottom light source 28 for emitting light upward toward the document on the transparent platform 24, and an image converter 30 for converting an image of the document into a digital image. The periphery 31 of the top cover 32 protrudes from its bottom surface and therefore forms a recess 33 in the center portion of the bottom surface. The top light source 34 of the top cover 32 is installed in the recess 33, and is a rectangular light panel for uniformly emitting light downward toward a transparent document placed on the transparent platform 24 when the top cover 32 is placed on the transparent platform 24. The light shield 36 is an opaque cover and can be optionally mounted in the recess 33 to cover the top light source 24. It comprises a flat back end 38 for pressing the document placed on the transparent platform 24. The flat back end 38 in the recess 33 is preferably in a dark color so that the edges of an opaque document pressed under the flat back end 38 can be easily identified when performing a reflective scanning by using the bottom light source 28.

The scanner 20 further comprises a sensor 40 positioned at one side of the top light source 34 for detecting whether the light shield 36 is mounted on the top light source 34, and a control circuit 42 installed inside the housing 22 and electrically connected with the scanning module 26, the top light source 34, and the sensor 40. When the sensor 40 detects that the top light source 34 is shielded by the light shield 36, the control circuit 42 will turn off the top light source 34, and turn on the bottom light source 28 so that the bottom light source 28 can emit light upward toward an opaque document placed on the transparent platform 24. The document image received by the image converter 30 at this time is generated by the light emitted from the bottom light source 28 and reflected from the opaque document. When the sensor 40 detects that the top light source 34 is not covered by the light shield 36, the control circuit 42 will turn on the top light source 34 and turn off the bottom light source 28 so that the top light source 34 can emit light downward toward a transparent document placed on the transparent platform 24. The document image received by the image converter 30 at this time is generated by the light emitted from the top light source 34 and transmitted through the transparent document.

Figure 6:
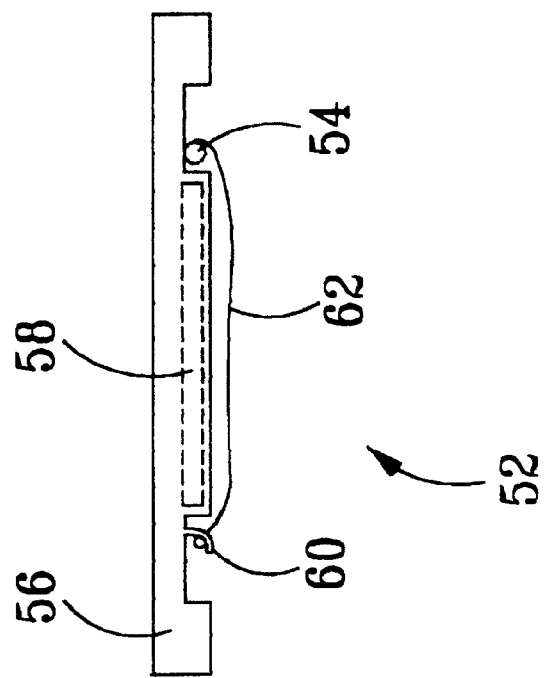
FIG. 6 is a sectional view along line 6—6 of the scanner shown in FIG. 5.
Figure 5:
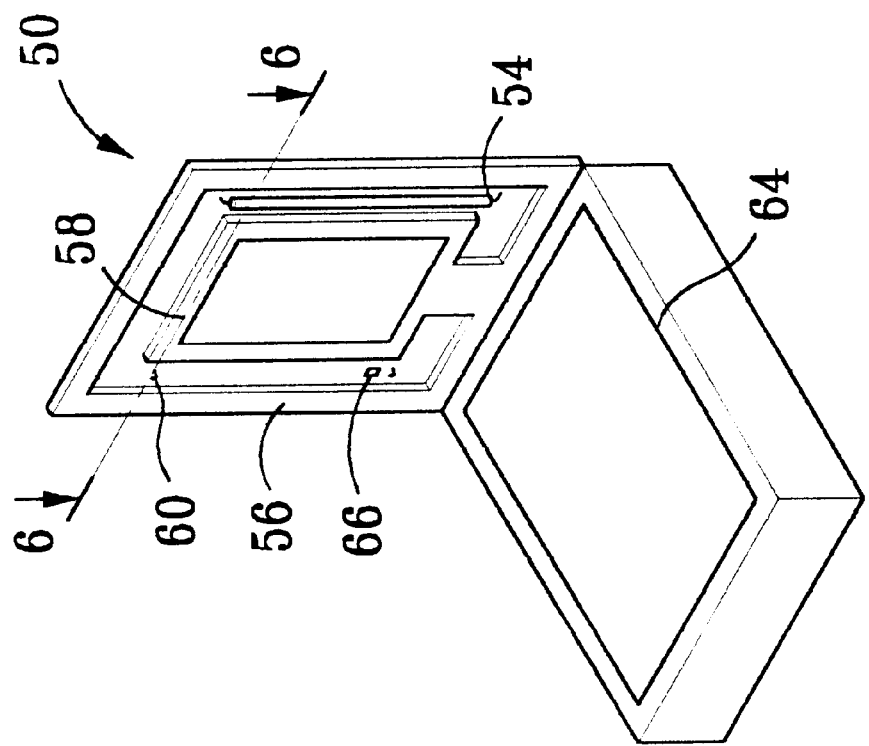
FIG. 5 is a perspective view of an alternative scanner according to the present invention.

Please refer to FIGS. 5 and 6. FIG. 5 shows a perspective view of an alternative scanner 50 according to the present invention. FIG. 6 is a sectional view along line 6—6 of the scanner 50 when the top light source 58 is covered by the light shield 52. The scanner 50 differs from the scanner 20 in the design of the light shield 52. The light shield 52 comprises an axle 54 installed under the top cover 56 and positioned at one side of the top light source 58, a latch 60 installed at another side of the top light source 58, and a flexible shielding cloth 62 wound around the axle 54. The shielding cloth 62 can be wound around the axle 54 so that the top light source 58 can emit light toward the document on the transparent platform 64, or pulled out of the axle 54 and connected to the latch 60 to shield the top light source 58. The scanner 50 also comprises a sensor 66 installed next to the latch 60 for detecting whether the shielding cloth 62 is connected to the latch 60 for shielding the top light source 58. When the scanner 50 detects the position of the shielding cloth 62 through the sensor 66, it will control the top light source 58 in the same manner as the scanner 20.

Those skilled in the art will readily observe that numerous modifications and alterations of the propeller may be made while retaining the teachings of the invention. Accordingly, the above disclosure should be construed as limited only by the metes and bounds of the appended claims.

What is claimed is:

1. A scanner comprising:
    a housing having a transparent platform for placing a document;
    a scanning module slidably installed inside the housing for scanning the document, the scanning module comprising a bottom light source for emitting light upward toward the document and an image converter for converting an image of the document into a digital image;
    a top cover movably installed on the housing;
    a top light source installed under the top cover for emitting light downward toward the document when the top cover is placed on the transparent platform;
    a light shield movably installed under the top cover for shielding the top light source;
    a sensor installed under the top cover for detecting whether the top light source is covered by the light shield; and
    a control circuit for switching on and off the top light source and the bottom light source in response to the sensor; wherein when the top light source is covered by the light shield, the document image received by the image converter is generated by the light emitted from the bottom light source, and when the top light source is not covered by the light shield, the bottom light source will be switched off and the document image received by the image converter is generated by the light emitted from the top light source.

2. The scanner of claim 1 wherein the top cover is rotatably installed on the housing.

3. The scanner of claim 1 wherein the light shield is removably mounted on the top light source.

4. The scanner of claim 3 wherein the light shield is an opaque cover with a flat back end for pressing the document against the transparent platform.

5. The scanner of claim 1 wherein the light shield comprises an axle installed at one side of the top light source, a latch installed at another side of the top light source, and a flexible shielding cloth wound around the axle wherein the shielding cloth can be wound around the axle or pulled out of the axle and connected to the latch to shield the top light source.

6. The scanner of claim 1 wherein the top light source comprises a substantially rectangular light panel for uniformly emitting light to the document.

7. The scanner of claim 1 wherein the control circuit is installed inside the housing and electrically connected to the scanning module, the top light source, and the sensor, and when the sensor detects that the top light source is covered by the light shield, the control circuit will turn off the top light source and turn on the bottom light source so that the bottom light source can emit light upward toward the document placed on the transparent platform, and when the sensor detects that the top light source is not covered by the light shield, the control circuit will turn on the top light source, and turn off the bottom light source so that the top light source can emit light downward toward the document.

8. A scanner comprising:
    a housing having a transparent platform for placing a document;
    a scanning module slidably installed inside the housing for scanning the document, the scanning module comprising a bottom light source for emitting light upward toward the document and an image converter for converting an image of the document into a digital image;
    a top cover movably installed on the housing, a periphery of the top cover protruding from a bottom surface of the top cover forming a recess;
    a planar top light source installed in the recess for emitting light downward toward the document when the top cover is placed on the transparent platform; and
    a light shield optionally mounted in the recess to cover the top light source;
wherein when the top light source is covered by the light shield, the document image received by the image converter is generated by the light emitted from the bottom light source and the recess is used as a background when scanning the document, and when the top light source is not covered by the light shield, the bottom light source will be switched off and the document image received by the image converter is generated by the light emitted from the top light source.

9. The scanner of claim 8 wherein the top cover is rotatably installed on the housing.

10. The scanner of claim 8 wherein the light shield is removably mounted on the top light source.

11. The scanner of claim 10 wherein the light shield is an opaque cover with a flat back end for pressing the document against the transparent platform.

12. The scanner of claim 8 wherein the light shield comprises an axle installed at one side of the top light source, a latch installed at another side of the top light source, and a flexible shielding cloth wound around the axle wherein the shielding cloth can be wound around the axle or pulled out of the axle and connected to the latch to shield the top light source.

13. The scanner of claim 8 wherein the top light source comprises a substantially rectangular light panel for uniformly emitting light to the document.

14. The scanner of claim 8 further comprising a sensor installed under the top cover for detecting whether the top light source is covered by the light shield, and a control circuit installed inside the housing and electrically connected to the scanning module, the top light source, and the sensor wherein when the sensor detects that the top light source is covered by the light shield, the control circuit will turn off the top light source and turn on the bottom light source so that the bottom light source can emit light upward toward the document placed on the transparent platform, and when the sensor detects that the top light source is not covered by the light shield, the control circuit will turn on the top light source, and turn off the bottom light source so that the top light source can emit light downward toward the document.

* * * * *